US011562180B2

(12) United States Patent
Nushi et al.

(10) Patent No.: US 11,562,180 B2
(45) Date of Patent: Jan. 24, 2023

(54) CHARACTERIZING FAILURES OF A MACHINE LEARNING MODEL BASED ON INSTANCE FEATURES

(71) Applicant: Microsoft Technology Licensing, LLC, Redmond, WA (US)

(72) Inventors: Besmira Nushi, Redmond, WA (US); Semiha Ece Kamar Eden, Redmond, WA (US); Eric Joel Horvitz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 936 days.

(21) Appl. No.: 16/403,460

(22) Filed: May 3, 2019

(65) Prior Publication Data
US 2020/0349395 A1    Nov. 5, 2020

(51) Int. Cl.
*G06K 9/62*     (2022.01)
*G06N 20/00*    (2019.01)
*G06F 11/36*    (2006.01)

(52) U.S. Cl.
CPC ........ *G06K 9/6264* (2013.01); *G06F 11/3692* (2013.01); *G06K 9/6218* (2013.01); *G06K 9/6228* (2013.01); *G06K 9/6257* (2013.01); *G06N 20/00* (2019.01)

(58) Field of Classification Search
CPC .. G06F 11/3692; G06N 20/00; G06K 9/6264; G06K 9/6218; G06K 9/6228; G06K 9/6257
See application file for complete search history.

(56) References Cited

U.S. PATENT DOCUMENTS

| | | | |
|---|---|---|---|
| 10,025,950 B1 | 7/2018 | Avasarala et al. | |
| 10,311,368 B2 | 6/2019 | Lokare et al. | |
| 2010/0080389 A1 | 4/2010 | Daniel et al. | |
| 2012/0158623 A1 | 6/2012 | Bilenko et al. | |
| 2019/0205794 A1* | 7/2019 | Hsu | G06F 16/285 |
| 2019/0361811 A1* | 11/2019 | Saeki | G06F 12/0868 |
| 2020/0349466 A1 | 11/2020 | Hoogerwerf et al. | |

OTHER PUBLICATIONS

"International Search Report and Written Opinion Issued in PCT Application No. PCT/US20/024530", dated Jul. 10, 2020, 13 Pages.

(Continued)

*Primary Examiner* — Casey L Kretzer
(74) *Attorney, Agent, or Firm* — Ray Quinney & Nebeker P.C; James Bullough

(57) ABSTRACT

The present disclosure relates to systems, methods, and computer readable media that evaluate performance of a machine learning system in connection with a test dataset. For example, systems disclosed herein may receive a test dataset and identify label information for the test dataset including feature information and ground truth data. The systems disclosed herein can compare the ground truth data and outputs generated by a machine learning system to evaluate performance of the machine learning system with respect to the test dataset. The systems disclosed herein may further generate feature clusters based on failed outputs and corresponding features and generate a number of performance views that illustrate performance of the machine learning system with respect to clustered groupings of the test dataset.

20 Claims, 9 Drawing Sheets

(56) References Cited

OTHER PUBLICATIONS

"Dogs vs cats dataset", Retrieved from: http://web.archive.org/web/20131002072551/https://www.kaggle.com/c/dogs-vs-cats/data, Oct. 2, 2013, 2 Pages.

Abraham, et al., "Bayesian Analysis of Some Outlier Problems in Time Series ", In Proceedings of Biometrika 66(2), Aug. 1, 1979, pp. 229-236.

Agarwal, Deepak, "Detecting Anomalies in Cross-classified Streams: A Bayesian Approach", In Proceedings of Knowledge and information systems 11, No. 1, Jan. 1, 2007, pp. 29-44.

Agrawal, et al., "Fast Algorithms for Mining Association Rules", In Proceedings of the 20th VLDB Conference, Sep. 12, 1994, pp. 487-499.

Amershi, et al., "Power to the People: The Role of Humans in Interactive Machine Learning", In Proceedings of AI Magazine, 35(4), Dec. 22, 2014, pp. 105-120.

Amodei, et al., "Concrete problems in AI safety", In Proceedings of arXiv preprint arXiv:1606.06565, Jun. 21, 2016, 29 Pages.

Anderson, et al., "Spice: Semantic Propositional Image Caption Evaluation", In Proceedings of European Conference on Computer Vision, Oct. 8, 2016, 17 Pages.

Attenberg, et al., "Beat the Machine: Challenging Humans to Find a Predictive Model's Unknown Unknowns", In Journal of Data and Information Quality (JDIQ), Mar. 4, 2015, 17 Pages.

Attenberg, et al., "Beat the Machine: Challenging Workers to Find the Unknown Unknowns.", In Workshops at the Twenty-Fifth AAAI Conference on Artificial Intelligence., Aug. 24, 2011, 6 Pages.

Auer, et al., "Finite-time Analysis of the Multiarmed Bandit Problem ", In Proceedings of Machine learning, May 1, 2002, pp. 235-256.

Baehrens, et al., "How to Explain Individual Classification Decisions", In Journal of Machine Learning Research, Jun. 2010, pp. 1803-1831.

Banerjee, et al., "METEOR: An Automatic Metric for MT Evaluation with Improved Correlation with Human Judgments", In Proceedings of ACL Workshop on Intrinsic and Extrinsic Evaluation Measures for Machine Translation and/or Summarization, Jun. 29, 2005, 8 Pages.

Bansal, et al., "Towards Transparent Systems: Semantic Characterization of Failure Modes", In Proceedings of European Conference on Computer Vision, Sep. 6, 2014, 5 Pages.

Berger, et al., "A Maximum Entropy Approach to Natural Language Processing.", In Journal of Computational linguistics 22(1), Mar. 1, 1996, pp. 39-71.

Bianchi, et al., "Prediction, learning, and games", In Cambridge University Press., Mar. 13, 2006, 403 Pages.

Breese, et al., "Decision-Theoretic Troubleshooting: A Framework for Repair and Experiment", In Proceedings of the Twelfth international conference on Uncertainty in artificial intelligence, Aug. 1, 1996, pp. 124-132.

Brennan, et al., "Evaluating the Predictive Validity of the Compas Risk and Needs Assessment System", In Proceedings of Criminal Justice and Behavior 36, No. 1, Jan. 2009, pp. 21-40.

Buolamwini, et al., "Gender Shades: Intersectional Accuracy Disparities in Commercial Gender Classification ", In Conference on Fairness, Accountability and Transparency, Jan. 21, 2018, 15 Pages.

Caruana, et al., "Intelligible Models for Healthcare: Predicting Pneumonia Risk and Hospital 30-day Readmission.", In Proceedings of the 21th ACM SIGKDD International Conference on Knowledge Discovery and Data Mining,, Aug. 10, 2015, 1721-1730.

Chandola, et al., "Outlier detection: A survey", In Proceedings of ACM Computing Surveys, Aug. 2007, 83 Pages.

Chapelle, et al., "An Empirical Evaluation of Thompson Sampling", In Proceedings of Advances in Neural Information Processing Systems 24, 2011, 9 Pages.

Chen, et al., "Failure Diagnosis Using Decision Trees", In Proceedings of 1st International Conference on Autonomic Computing, May 17, 2004, 8 Pages.

Crawford, Kate, "Artificial Intelligence's White Guy Problem", , Jun. 26, 2016, 4 Pages.

Decoste, et al., "Training Invariant Support Vector Machines", In Proceedings of Machine learning, Jan. 1, 2002, pp. 161-190.

Deng, et al., "Imagenet: A Large-scale Hierarchical Image Database. ", In IEEE conference on computer vision and pattern recognition, Jun. 20, 2009, pp. 248-255.

Dietterich, et al., "Rise of Concerns About Ai: Reflections and Directions ", In Proceedings of Communications of the ACM 58(10), Oct. 1, 2015, pp. 38-40.

Elkan, Charles, "The Foundations of Cost-Sensitive Learning", In Proceedings of the Seventeenth International Joint Conference on Artificial Intelligence, vol. 17, No. 1, Aug. 4, 2001, 6 Pages.

Eskin, et al., "A Geometric Framework for Unsupervised Anomaly Detection", In Proceedings of Applications of data mining in computer security, 2002, 20 Pages.

Eskin, Eleazar, "Anomaly Detection Over Noisy Data Using Learned Probability Distributions", In Proceedings of CML, 2000, 8 Pages.

Fang, et al., "From Captions to Visual Concepts and Back", In Proceedings of the IEEE conference on computer vision and pattern recognition, Jun. 7, 2015, pp. 1473-1482.

Fawcett, et al., "Adaptive Fraud Detection", In Proceedings of Data mining and knowledge discovery, 1(3), Sep. 1, 1997, pp. 291-316.

Feige, Uriel, "A Threshold of Ln N for Approximating Set Cover", In Journal of the ACM (JACM), vol. 45 No. 4, pp. 334-652, Jul. 1, 1998, pp. 634-652.

Fisher, et al., "Knowledge Acquisition via Incremental Conceptual Clustering", In Proceedings of Machine learning, 2 (2),, Sep. 1, 1987, pp. 139-172.

Goodman, et al., "Eu Regulations on Algorithmic Decision-making and a Right to Explanation.", In ICML workshop on human interpretability in machine learning (WHI), 2016, pp. 26-30.

Graepel, et al., "Invariant Pattern Recognition by Semidefinite Programming Machines", In Proceedings of Advances in neural information processing systems, 2004, 8 Pages.

Groce, et al., "You are the Only Possible Oracle: Effective Test Selection for End Users of Interactive Machine Learning Systems", In Proceedings of IEEE Transactions on Software Engineering, 40(3), Dec. 12, 2013, pp. 307-323.

Gunning, David, "Explainable artificial intelligence (xai)", In Proceedings of Defense Advanced Research Projects Agency (DARPA), nd Web, 2017, 18 Pages.

Han, et al., "Data Mining: Concepts and Techniques.", In Proceedings of Elsevier, Jun. 9, 2011, 740 Pages.

Horviiz, et al., "A Bayesian Approach to Tackling Hard Computational Problems ", In Proceedings of the Seventeenth conference on Uncertainty in artificial intelligence, Aug. 2, 2001, pp. 235-244.

Horvitz, et al., "Artificial intelligence in the open world.", In Proceedings of Presidential Address, AAAI, Jul. 2008, 28 Pages.

Jain, et al., "Algorithms for clustering data ", In Book of Algorithms for clustering data, 1988, 334 Pages.

Jiang, et al., "A Two-Stage Approach to Domain Adaptation for Statistical Classifiers.", In Proceedings of the sixteenth ACM conference on Conference on information and knowledge management, Nov. 6, 2007, pp. 401-410.

Johnson, David, et al., "Approximation Algorithms for Combinatorial Problems.", In Journal of computer and system sciences, 9(3), Dec. 1, 1974, pp. 256-278.

Kamar, et al., "Combining Human and Machine Intelligence in Large-scale Crowdsourcing.", In Proceedings of the 11th International Conference on Autonomous Agents and Multiagent Systems—vol. 1, Jun. 4, 2012, pp. 467-474.

Kamar, Ece, "Directions in Hybrid Intelligence: Complementing AI Systems with Human Intelligence", In Proceedings of the 25th International Joint Conference on Artificial Intelligence, Jul. 9, 2016, pp. 4070-4073.

Kautz, et al., "Dynamic Restart Policies", In Proceedings of Aaai/iaai., Jul. 28, 2002, pp. 674-681.

Kim, et al., "The Bayesian Case Model: A Generative Approach for Case-based Reasoning and Prototype Classification", In Advances in Neural Information Processing Systems, 2014, 9 Pages.

(56) References Cited

OTHER PUBLICATIONS

Kulesza, et al., "Principles of Explanatory Debugging to Personalize Interactive Machine Learning.", In Proceedings of the 20th international conference on intelligent user interfaces,, Mar. 18, 2015, pp. 126-137.

Lakkaraju, et al., "Confusions Over Time: An Interpretable Bayesian Model to Characterize Trends in Decision Making", In Proceedings of in Advances in Neural Information Processing Systems, 2016, 9 Pages.

Lakkaraju, et al., "Discovering blind spots of predictive models: Representations and policies for guided exploration", In Proceedings of arXiv preprint arXiv:1610.09064, 2016, 31 Pages.

"Non Final Office Action Issued in U.S. Appl. No. 16/403,459", dated Nov. 10, 2021, 49 Pages.

"International Search Report & Written Opinion Issued in PCT Application No. PCT/US2020/024531", dated Jul. 8, 2020, 14 Pages.

Ramakrishnan, et al., "Discovering Blind Spots in Reinforcement Learning", In Repository of arXiv:1805.08966v1, May 23, 2018, 9 Pages.

Ramakrishnan, Ramya, "Error Discovery through Human-AI Collaboration", In Thesis Submitted to the Deparlment of Electrical Engineering and Computer Science in Partial Fulfillment of the Requirements for the Degree of Doctor of Philosophy in Computer Science at the Massachusetts Institute of Technology, Sep. 2019, 202 Pages.

"Final Office Action Issued in U.S. Appl. No. 16/403,459", dated Jun. 14, 2022, 23 Pages.

Lakkaraju, et al., "Identifying Unknown Unknowns in the OpenWorld: Representations and Policies for Guided Exploration", In Proceedings of Thirty-First AAAI Conference on Artificial Intelligence, Feb. 13, 2017, pp. 2124-2132.

Lakkaraju, et al., "Interpretable & Explorable Approximations of Black Box Models", In Proceedings of arXiv preprint arXiv:1707.01154, Jul. 4, 2017, 5 Pages.

Lewis, et al., "A Sequential Algorithm for Training Text Classifiers", In Proceedings of InSIGIR'94, 1994, 10 Pages.

Li, et al., "A New Descriptive Clustering Algorithm Based on Nonnegative Matrix Factorization", In Proceedings of IEEE International Conference on Granular Computing, Aug. 26, 2008, pp. 407-412.

Lin, et al., "Microsoft Coco: Common Objects in Context", In the Proceedings of 13th European Conference on Computer Vision, Sep. 6, 2014, pp. 1-15.

McAuley, et al., "Inferring Networks of Substitutable and Complementary Products.", In Proceedings of the 21th ACM SIGKDD international conference on knowledge discovery and data mining, Aug. 10, 2015, 10 Pages.

Michalski, et al., "Learning from observation: Conceptual clustering", In Proceedings of Machine learning, 1983, pp. 345-377.

Moulines, et al., "On Upper-Confidence Bound Policies for Non-Stationary Bandit Problems", In Proceedings of arXiv preprint arXiv:0805 3415, May 22, 2008, 26 Pages.

Nushi, et al., "On Human Intellect and Machine Failures: Troubleshooting Integrative Machine Learning Systems", In Proceedings of the Thirty-First AAAI Conference on Artificial Intelligence, Feb. 12, 2017, pp. 1017-1025.

Nushi, et al., "Towards Accountable AI: Hybrid Human-Machine Analyses for Characterizing System Failure", In Proceedings of Sixth AAAI Conference on Human Computation and Crowdsourcing., Jun. 15, 2018, 10 Pages.

Pang, et al., "A Sentimental Education: Sentiment Analysis using Subjectivity Summarization Based on Minimum Cuts", In Proceedings of the 42nd annual meeting on Association for Computational Linguistics, Jul. 21, 2004, 8 Pages.

Pang, et al., "Seeing Stars: Exploiting Class Relationships for Sentiment Categorization with Respect to Rating Scales", In Proceedings of the 43rd Annual Meeting on Association for Computational Linguistics, Jun. 25, 2005, 10 Pages.

Papineni, et al., "BLEU: a method for automatic evaluation of machine translation", In Proceedings of the 40th Annual Meeting on Association for Computational Linguistics, Jul. 7, 2002, pp. 311-318.

Parikh, et al., "Finding the Weakest link in Person Detectors", In Proceedings of IEEE Conference on Computer Vision and Pattern Recognition (CVPR),, Jun. 20, 2011, pp. 1425-1432.

Poursabzi, et al., "Manipulating and Measuring Model Interpretability", In Proceedings of NIPS Transparentand Interpretable Machine Learning in Safety Critical Environments Workshop., Feb. 21, 2018, 20 Pages.

Quionero, et al., "Dataset Shift in Machine Learning", In Book of Dataset Shift in Machine Learning by MIT Press, Feb. 27, 2009, 246 Pages.

Ribeiro, et al., "Modelagnostic Interpretability of Machine Learning.", In Proceedings of arXiv preprint arXiv:1606.05386., Jun. 16, 2016, pp. 91-95.

Ribeiro, et al., "Why should i trust you?: Explaining the Predictions of Any Classifier", In Proceedings of the 22nd ACM SIGKDD international conference on knowledge discovery and data mining, Aug. 13, 2016, pp. 1135-1144.

Russell, et al., "Research Priorities for Robust and Beneficial Artificial Intelligence", In Proceedings of AI Magazine 36(4), Dec. 31, 2015, pp. 105-114.

Salay, et al., "An Analysis of ISO 26262: Using Machine Learning Safely in Automotive Software", In Proceedings of CoRR abs/1709.02435, Sep. 7, 2017, 6 Pages.

Salisbury, et al., "Toward Scalable Social alt text: Conversational Crowdsourcing as a Tool for Refining Vision-to-language Technology for the Blind.", In Fifth AAAI Conference on Human Compulation and Crowdsourcing., Sep. 21, 2017, pp. 147-156.

Sculley, et al., "Hidden Technical Debt in Machine Learning Systems.", In Advances in Neural Information Processing Systems, Dec. 7, 2015, 9 Pages.

Settles, Burr, "Active Learning Literature Survey", In Technical Report, 1648 of Computer Sciences, University of Wisconsin-Madison, 2009, 67 Pages.

Settles, et al., "Multiple-Instance Active Learning", In Proceedings of In Advances in neural information processing systems, 2008, 8 Pages.

Seung, et al., "Query by Committee", In Proceedings of the fifth annual workshop on Computational learning theory, Jul. 1, 1992, pp. 287-294.

Shimodaira, Hidetoshi, "Improving predictive inference under covariate shift by weighting the log-likelihood function", In Proceedings of Journal of statistical planning and inference 90, No. 2, Oct. 1, 2000, pp. 227-244.

Shinsel, et al., "Mini-crowdsourcing end-user assessment of intelligent assistants: A cost-benefit study.", In Proceedings of IEEE Symposium on Visual Languages and Human-Centric Computing (VL/HCC), Sep. 18, 2011, pp. 47-54.

Slivkins, et al., "Adapting to a Changing Environment: the Brownian Restless Bandits.", In Proceedings of COLT, Jul. 9, 2008, 12 Pages.

Steinfeld, et al., "Evaluation of an integrated multi-task machine learning system with humans in the loop.", In Proceedings of the Workshop on Performance Metrics for Intelligent Systems, Aug. 28, 2007, pp. 168-174.

Teo, et al., "Convex Learning with Invariances", In Proceedings of Advances in neural information processing systems, 2008, 8 Pages.

Vaughan, Jennifer, "Making better use of the crowd.", In Technical report. Working paper, Dec. 5, 2016, 26 pages.

Vedantam, et al., "Cider: Consensus-based image description evaluation.", In Proceedings of the conference on computer vision and pattern recognition, 2015, pp. 4566-4575.

Ware, et al., "Interactive Machine Learning: Letting Users Build Classifiers.", In International Journal of Human-Computer Studies, Sep. 1, 2001, 7 Pages.

Weiss, Dawid, "Descriptive Clustering as a Method for Exploring Text Collections", A dissertation submitted to the Council of the Faculty of Computer Science and Management, Poznan University of Technology, 2006, 143 Pages.

(56) References Cited

OTHER PUBLICATIONS

Widodo, et al., "Support Vector Machine in Machine Condition Monitoring and Fault Diagnosis", In Proceedings of Mechanical systems and signal processing 21(6), Aug. 1, 2007, 38 Pages.

Wolpert, et al., "No Free Lunch Theorems for Optimization.", In Proceedings of IEEE transactions on evolutionary computation, 1(1), Apr. 1, 1997, pp. 67-82.

Zhang, et al., "Predicting failures of vision systems", In Proceedings of the IEEE Conference on Computer Vision and Pattern Recognition, 2014, 8 Pages.

Zhang, et al., "The Value of Unlabeled Data for Classification Problems.", In Proceedings of the Seventeenth International Conference on Machine Learning, Jun. 2000, 15 Pages.

Zhu, et al., "Combining Active Learning and Semi-supervised Learning using Gaussian Fields and Harmonic Functions", In ICML workshop on the continuum from labeled to unlabeled data in machine learning and data mining, Aug. 21, 2003, 8 Pages.

\* cited by examiner

CHARACTERIZING FAILURES OF A MACHINE LEARNING MODEL BASED ON INSTANCE FEATURES

CROSS-REFERENCE TO RELATED APPLICATIONS

N/A

BACKGROUND

Recent years have seen significant improvements and developments in machine learning models that are trained to generate outputs or perform various tasks. Indeed, as machine learning models become more prevalent and complex, the utility of machine learning models continues to increase. For instance, machine learning technology is now being used in applications of transportation, healthcare, criminal justice, education, and productivity. Moreover, machine learning models are often trusted to make high-stakes decisions with significant consequences for individuals and companies.

While machine learning models provide useful tools for processing content and generating a wide variety of outputs, accuracy and reliability of machine learning models continues to be a concern. For example, because machine learning models are often implemented as black boxes in which only inputs and outputs are known, failures or inaccuracies in outputs of machine learning models are difficult to analyze or evaluate. As a result, it is often difficult or impossible for conventional training or testing systems to understand what is causing the machine learning model to fail or generate inaccurate outputs with respect to various inputs. Moreover, conventional training and testing systems are often left to employ brute-force training techniques that are often expensive and inefficient at correcting inaccuracies in machine learning models.

DETAILED DESCRIPTION

Figure 1:
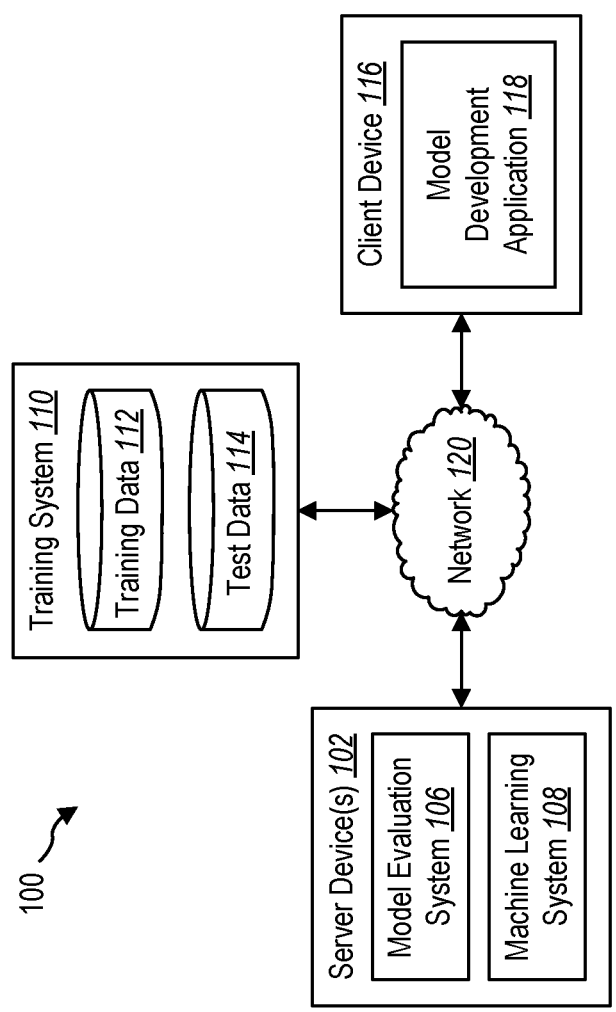
FIG. 1 illustrates an example environment of a model evaluation system for evaluating one or more models of a machine learning system in accordance with one or more embodiments.

The present disclosure is generally related to a model evaluation system for evaluating performance of a machine learning system trained to generate one or more outputs based on one or more inputs. In particular, as will be discussed in further detail below, the model evaluation system may receive a test dataset including a set of test instances. The model evaluation system may further receive or otherwise identify label information including attribute or feature information for the test instances and ground truths associated with expected outputs of the machine learning system with respect to the test instances from the test dataset. As will be discussed below, the model evaluation system can generate groupings or clusters of the training instances defined by one or more combinations of features and based on identified inconsistencies between the ground truths and outputs generated by the machine learning system. Moreover, the model evaluation system may generate or identify groupings of clusters defined by one or more combinations of features associated with members of a set of test instances and/or additional considerations such as evidential information provided by the machine learning system in the course of its analyses of instances or considerations of the details of the application context from where a test case has been sampled.

The present disclosure includes a number of practical applications that provide benefits and/or solve problems associated with characterizing failures of a machine learning system to better understand when and how the machine learning system might be failing. For example, by grouping instances from a test dataset into clusters based on correlation of features and identified errors (e.g., concentrations of errors) of the machine learning system, the model evaluation system can provide tools and functionality to enable an individual to understand what circumstances may be causing the machine learning system to fail. In particular, where certain types of training data are unknowingly underrepresented in training the machine learning system, clustering or otherwise grouping instances based on correlation of features and identified errors may indicate specific clusters that are associated with a higher concentration of errors or inconsistences than other clusters.

In addition to identifying clusters having a higher concentration of errors, the model evaluation system may additionally identify and provide an indication of one or more components of the machine learning system that are contributing to the errors. For example, the model evaluation system may further identify information associated with confidence values and outputs at respective stages of the machine learning system to determine whether one or more specific models or components of the machine learning system are generating a higher number of erroneous outputs than other stages of the machine learning system. As such, in an example where a machine learning system includes multiple machine learning models (e.g., an object detection model and a ranking model), the model evaluation system may determine that errors are more commonly linked to one or the other machine learning model.

In each of the above example, the model evaluation system can utilize the clustering information and model performance information to more efficiently and effectively refine the machine learning system in a variety of ways. For example, by identifying clusters associated with a higher concentration of output errors, the model evaluation system can determine that additional training data having similar features as the identified cluster may be selectively used to further train or refine the machine learning model without using or sampling an unnecessarily broad or robust set of training resources. Moreover, the model evaluation system can selectively train or refine discrete components of the machine learning system rather than training the entire pipeline of components that make up the machine learning system. This selective refinement and training of the machine learning system may significantly reduce utilization of processing resources as well as accomplish a higher degree of accuracy for the resulting machine learning system.

In addition to generally identifying errors and refining training of a machine learning system, the model evaluation system can provide one or more performance views to enable a developer to visualize when and how the machine learning system is failing. For example, as will be discussed in further detail below, the model evaluation system can generate a number of views including a global view that indicates performance with respect to multiple clusters, cluster views that enable a developer to view additional data in connection with individual clusters, and an instance view to identify how a machine learning system generated a specific output for an individual test instance. The developer may use these performance views to better understand the machine learning system as well as selectively guide refinement or training of the machine learning model to more accurately generate correct outputs in accordance with the desired purpose of the machine learning system.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a regression model, a language model, an object detection model) that can be tuned (e.g., trained) based on training input to approximate unknown functions. For example, a machine learning model may refer to a neural network or other machine learning algorithm or architecture that learns and approximates complex functions and generate outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

As used herein, an "instance" refers to an input object that may be provided as an input to a machine learning system to use in generating an output. For example, an instance may refer to a digital image, a digital video, a digital audio file, or any other media content item. An instance may further include other digital objects including text, identified objects, or other types of data that may be analyzed using one or more algorithms. In one or more embodiments described herein, an instance is a "training instance," which refers to an instance from a collection of training instances used in training a machine learning system. An instance may further be a "test instance," which refers to an instance from a test dataset used in connection with evaluating performance of a machine learning system by the model evaluation system. Moreover, an "input instance" may refer to any instance used in implementing the machine learning system for its intended purpose. As used herein, a "test dataset" may refer to a collection of test instances and a "training dataset" may refer to a collection of training instances.

As used herein, "test data" may refer to any information associated with a test dataset or respective test instance from the test dataset. For example, in one or more embodiments described herein, test data may refer to a set of test instances and corresponding label information. As used herein, "label information" refers to labels including any information associated with respective instances. For example, label information may include identified features (e.g., feature labels) associated with content from test instances. By way of example, where a test instance refers to a digital image, identified features may refer to identified objects within the digital image and/or a count of one or more identified objects within the digital image. As a further example, where a test instance refers to a face or individual (e.g., an image of a face or individual), identified features or feature labels may refer to characteristics about the content such as demographic identifiers (e.g., race, skin color, hat, glasses, smile, makeup) descriptive of the test instance. Other examples include characteristics of the instance such as a measure of brightness, quality of an image, or other descriptor of the instance.

In addition to characteristics of the test instances, features (e.g., feature data) may refer to evidential information provided by a machine learning system during execution of a test. For example, feature data may include information that comes from a model or machine learning system during execution of a test. This may include confidence scores, runtime latency, etc. Using this data, systems described herein can describe errors with respect to system evidence rather than just content of an input. As an example, a performance view may indicate instances of system failure or rates of failure for identified feature clusters when a confidence of one or more modules is less than a threshold.

As a further example, features (e.g., feature data) may refer to information that comes from the contest of where a test instance comes from. For example, where a machine learning system is trained to perform face identification, feature data for a test instance may include information about whether a person is alone in a photo or are surrounded by other people or objects (e.g., and how many). In this way, performance views may indicate failure conditions that occur under different contexts of test instances.

In addition to identified features or feature labels, the "label information" may further include ground truth data associated with a corresponding machine learning system (or machine learning models). As used herein, "ground truth data" refers to a correct or expected outcome (e.g., an output) upon providing a test instance as an input to a machine learning system. Ground truth data may further indicate a confidence value or other metric associated with the expected outcome. For example, where a machine learning system is trained to identify whether an image of a person should be classified as a man or a woman, the ground truth data may simply indicate that the image includes a photo of a man or woman. The ground truth data may further indicate a measure of confidence (or other metric) that the classification is correct. This ground truth data may be obtained upon confirmation from one or a plurality of individuals when presented the image (e.g., at an earlier time). As will be discussed in further detail below, this ground truth data may be compared to outputs from a machine learning system to generate error labels as part of a process for evaluating performance of the machine learning system.

In one or more embodiments described herein, a machine learning system may generate an output based on an input instance in accordance with training of the machine learning system. As used herein, an "output" or "outcome" of a machine learning system refers to any type of output from a machine learning model based on training of the machine learning model to generate a specific type of output or outcome. For example, an output may refer to a classification of an image, video, or other media content item (or any type of instance) such as whether a face is detected, an identification of an individual, an identification of an object, a caption or description of the instance, or any other classification of a test instance corresponding to a purpose of the machine learning system. Other outputs may include output images, decoded values, or any other data generated based on one or more algorithms employed by a machine learning system to analyze an instance.

As used herein, a "failed output" may refer to an output from a machine learning system determined to be inaccurate or inconsistent with a corresponding ground truth. For example, where a machine learning system is trained to generate a simple output, such as an identification of an object, a count of objects, or a classification of a face as male or female, determining a failed output may be as simple as identifying that an output does not match a corresponding ground truth from the test data. In one or more embodiments, the machine learning system may implement other more complex techniques and methodologies for comparing an output to corresponding ground truth data to determine whether an output is a failed output (e.g., inconsistent with the ground truth data) or correct output. In one or more embodiments, a failure label may be added or otherwise associated with an instance based on a determination of a failed output.

While one or more embodiments described herein refer to specific types of machine learning systems (e.g., classification systems, capturing systems) that employ specific types of machine learning models (e.g., neural networks, language models), it will be understood that features and functionalities described herein may be applied to a variety of machine learning systems. Moreover, while one or more embodiments described herein refer to specific types of test instances (e.g., images, videos) having limited input domains, features and functionalities described in connection with these examples may similarly apply to other types of instances for various applications having a wide variety of input domains.

Additional detail will now be provided regarding a model evaluation system in relation to illustrative figures portraying example implementations. For example, FIG. 1 illustrates an example environment 100 in which performance of a machine learning system may be evaluated in accordance with one or more embodiments described herein. As shown in FIG. 1, the environment 100 includes one or more server device(s) 102 including a model evaluation system 106 and one or more machine learning systems 108. The environment 100 further includes a training system 110 having access to training data 112 and test data 114 thereon. The environment 100 also includes a client device 116 having a model development application 118 implemented thereon.

As shown in FIG. 1, the server device(s) 102, training system 110, and client device 116 may communicate with each other directly or indirectly through a network 120. The network 120 may include one or multiple networks and may use one or more communication platforms or technologies suitable for transmitting data. The network 120 may refer to any data link that enables the transport of electronic data between devices and/or modules of the environment 100. The network 120 may refer to a hardwired network, a wireless network, or a combination of a hardwired and a wireless network. In one or more embodiments, the network 120 includes the Internet.

The client device 116 may refer to various types of computing devices. For example, the client device 116 may include a mobile device such as a mobile telephone, a smartphone, a personal digital assistant (PDA), a tablet, or a laptop. Additionally, or alternatively, the client device 116 may include a non-mobile device such as a desktop computer, server device, or other non-portable device. The server device(s) 102 may similarly refer to various types of computing devices. Moreover, the training system 110 may be implemented on one of a variety of computing devices. Each of the devices of the environment 100 may include features and functionality described below in connection with FIG. 7.

As mentioned above, the machine learning system 108 may refer to any type of machine learning system trained to generate one or more outputs based on one or more input instances. For example, the machine learning system 108 may include one or more machine learning models trained to generate an output based on training data 112 including any number of sampled training instances and corresponding truth data (e.g., ground truth data). The machine learning system 108 may be trained locally on the server device(s) 102 or may be trained remotely (e.g., on the training system 110) and provided, as trained, to the server device 102 for further testing or implementing. Moreover, while FIG. 1 illustrates an example in which the training system 110 is implemented on a separate device or system of devices as the model evaluation system 106, the training system 110 may be implemented (in part or as a whole) on the server device(s) 102 in connection with or as an integrated subsystem of the model evaluation system 106.

As will be discussed in further detail below, the model evaluation system 106 may evaluate performance of the machine learning system 108 and provide one or more performance views to the client device 116 for display to a user of the client device 116. In one or more embodiments, the model development application 118 refers to a program running on the client device 116 associated with the model evaluation system 106 and capable of rendering or otherwise presenting the performance views via a graphical user interface of the client device 116. In one or more embodiments, the model development application 118 refers to a program installed on the client device 116 associated with the model evaluation system 106. In one or more embodiments, the model development application 118 refers to a web application through which the client device 116 provides access to features and tools described herein in connection with the model evaluation system 106.

Figure 2:
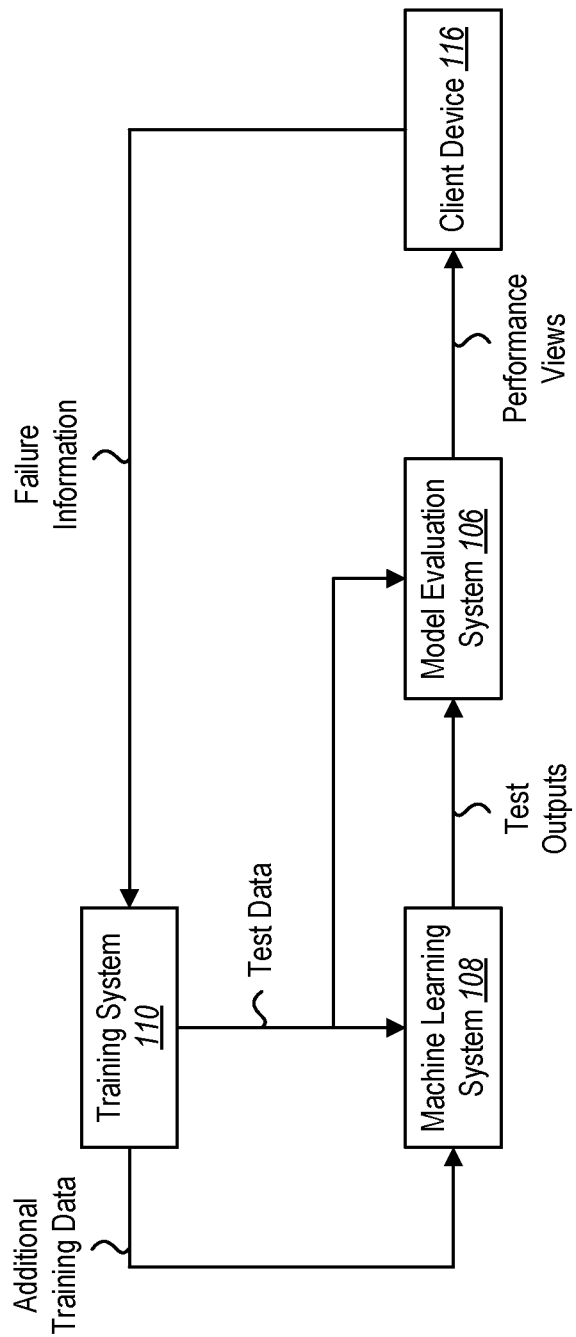
FIG. 2 illustrates an example implementation of the model evaluation system for evaluating performance of a machine learning system and selectively refining the machine learning system in accordance with one or more embodiments.

Additional detail will now be given in connection with an example implementation in which the model evaluation system 106 facilitates evaluating performance of a machine learning system 108 and providing one or more performance views to the client device 116. For example, as shown in FIG. 2, a machine learning system 108 may receive test data (e.g., test data 114) from the training system 110. The test data provided to the machine learning system 108 may include a test dataset including a plurality of test instances to provide as input to the machine learning system 108. Based on previous training of the machine learning system 108, the machine learning system 108 may generate test outputs to provide to the model evaluation system 106 for evaluation of system performance.

As shown in FIG. 2, in addition to providing test data including test instances to the machine learning system 108, the model evaluation system 106 may additionally receive test data including data associated with the test instances. For example, the model evaluation system 106 may receive label information including ground truth data that indicates expected or "correct" outputs of the machine learning model 108 based on the training of the machine learning system 108. The ground truth data may be compared to the test outputs to determine which of the outputs are erroneous or inaccurate with respect to the ground truth data.

As will be discussed in further detail below, the model evaluation system 106 may evaluate a performance of the machine learning system 108 based on test data 114 corresponding to a set of test instances. For example, the model evaluation system 106 may receive test data 114 including a plurality of test instances to provide as inputs to the machine learning system 108 to generate a corresponding set of outputs (e.g., test outputs) based on training of the machine learning system 108. The model evaluation system 106 may additionally receive test data 114 including ground truths and other label information associated with the plurality of test instances to determine rates of accuracy of the outputs with respect to corresponding ground truths. In one or more embodiments, the model evaluation system 106 generates error labels for the instances where the outputs from the machine learning system 108 are incorrect or otherwise inaccurate with respect to the ground truth data.

The model evaluation system 106 may additionally identify label information associated features of the test dataset. For example, the model evaluation system 106 can identify features of test instances including characteristics of content (e.g., visual features, quality features such as image quality or image brightness, detected objects and/or counts of detected objects) from the test instances. In one or more embodiments, the model evaluation system 106 receives feature labels together with the test data 114 (e.g., where the test instances have been previously labeled by individuals or other machine learning model). Alternatively, in one or more embodiments, the model evaluation system 106 evaluates the content of the test instances to generate a set of augmented features to include within labeling information associated with respective test instances.

The model evaluation system 106 may group the test instances based on the features and output errors. In particular, the model evaluation system 106 may generate feature clusters including groupings of test instances based on determined correlations between identified features and inaccurate or erroneous outputs from the machine learning system 108. For example, the model evaluation system 106 may identify groupings of test instances based on feature labels for which corresponding outputs have a higher rate of failure than other groups of test instances associated with different feature labels.

As will be discussed in further detail below, the model evaluation system 106 may generate and provide performance views that include performance metrics associated with a plurality of feature clusters. In particular, the model evaluation system 106 may group the test instances based on corresponding feature labels indicating features or combinations of features and corresponding performance of the machine learning system 108 with respect to the groupings of test instances. Additional detail in connection with how the test instances are clustered is discussed in further detail below (e.g., in connection with FIG. 3).

As shown in FIG. 2, the model evaluation system 106 may provide performance views to the client device 116. In particular, the model evaluation system 106 may provide performance views including performance information and visualizations of performance of the machine learning system 108 to the client device 116. The performance views may include global views associated with performance of the machine learning system 108 across a large set of test instances provided as input to the machine learning system 108. The performance views may further include performance information of the machine learning system 108 with respect to individual clusters of instances based on corresponding features or combinations of features. The performance views may also include individual performance metrics or measurements with respect to individual instances. In one or more embodiments, the performance views may include information associated with performance of individual components (e.g., individual machine learning models) that make up the machine learning system 108.

In one or more examples described herein, the model evaluation system 106 may identify or receive an indication of a feature cluster of interest. The feature cluster of interest may be identified based on having a higher concentration of errors than other identified feature clusters, or selected (e.g., by a user of the client device 116) based on observed criteria. As will be discussed below, the model evaluation system 106 and/or client device 116 may provide failure information corresponding to the feature cluster of interest for use in refining or further training the machine learning system 108.

In the example shown in FIG. 2, the client device 116 may further provide failure information to the training system 110. In one or more embodiments, the failure information may include an indication of one or more feature clusters or portions of the training dataset for which a higher rate of errors occur relative to other feature clusters or portions of the training dataset. For example, a user of the client device 116 may navigate one or more of the performance views to understand that a specific feature or combination of feature correlates to a higher concentration of error outputs than other features or combinations of features. Accordingly, the failure information may provide data related to types of training data that were under represented in training the machine learning system 108.

While FIG. 2 illustrates an example in which the client device 116 provides the failure information to the training system 110, in one or more embodiments, the model evaluation system 106 provides the failure information to the training system 110. For example, rather than providing the performance views to the client device 116 and awaiting user input indicating information associated with one or more feature clusters to provide to the training system 110, the model evaluation system 106 may automatically identify one or more feature clusters that correlate more strongly with failed outputs from the machine learning system 108. The model evaluation system 106 may further provide the failure information to the training system 110 without necessarily providing the performance views to the client device 116. In one or more embodiments, the client device 116 provides the failure information back to the model evaluation system 106, which provides the failure information to the training system 110 for further processing.

As shown in FIG. 2, the upon receiving the failure information from the client device 116 (or from the model evaluation system 106), the training system 110 may identify additional training data to use in refining or further training the machine learning system 108. For example, in one or more embodiments, the training system 110 selectively identifies additional training data based on a feature or combination of features corresponding to an identified feature cluster associated with a high concentration of failed outputs. This may include collecting additional training data from users by providing content to individuals and soliciting further ground truth data. Alternatively, this may include sampling additional training data from a larger collection of training data based on features or combinations of features of training instances from the training data.

While FIGS. 1-2 illustrate an example in which the training system 110 and the model evaluation system 106 are implemented independent from one another, it will be understood that one or more embodiments in which the training system 110 receives failure information and selectively identifies additional training information may alternatively be performed by the model evaluation system 106. For example, in one or more embodiments, the training system 110 may be implemented within the model evaluation system 106 such that the model evaluation system 106 fine-tunes the machine learning system 108 based on selectively identified training data in accordance with one or more embodiments described herein.

Figure 3:
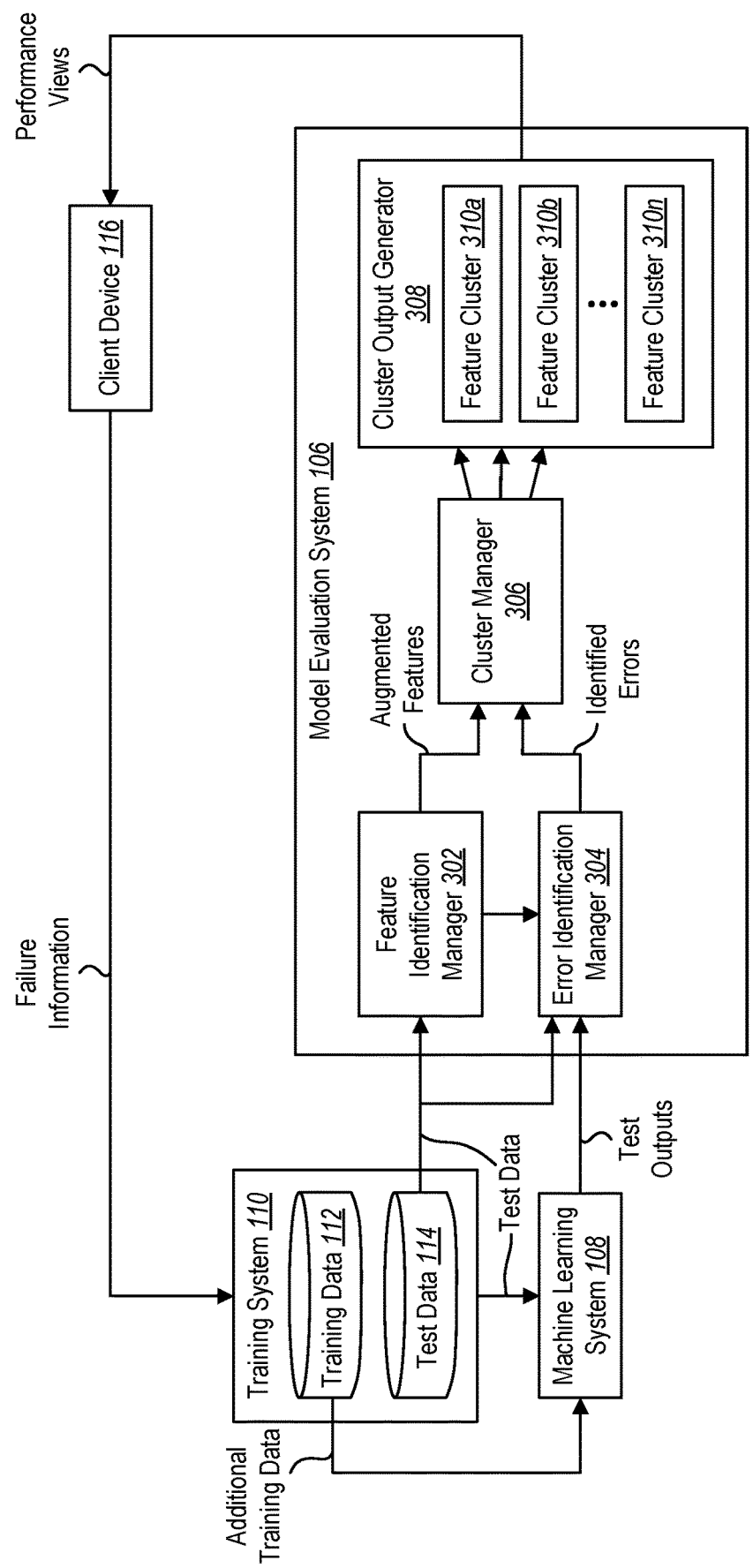
FIG. 3 illustrates an example implementation of the model evaluation system for identifying instances from a training dataset based on identified errors of the machine learning system in accordance with one or more embodiments.

Moving onto FIG. 3, this illustration provides additional information in connection with an example framework in which the model evaluation system 106 characterizes performance of the machine learning system 108 with respect to a plurality of feature clusters. As shown in FIG. 3, the model evaluation system 106 may include a feature identification manager 302, an error identification manager 304, and a cluster manager 306. The model evaluation system 106 may additionally include a cluster output generator 308 that generates performance views based on a plurality of feature clusters 310a-n identified or otherwise generated by the model evaluation system 106. Further detail in connection with each of these components 302-308 is provided below.

As shown in FIG. 3, the machine learning system 108 may receive test data 114 from the training system 110 that includes a plurality of test instances (e.g., a training dataset) to provide as inputs to the machine learning system 108. As discussed above in connection with FIG. 2, the machine learning system 108 may generate test outputs based on training of the machine learning system 108 (e.g., based on sampled training data 112). The test outputs may include a variety of different outputs in accordance with a programmed purpose or component architecture of the machine learning system 108.

The training system 110 may further provide test data 114 to the model evaluation system 106. In particular, the training system may provide test data 114 including training instances and associated data to a feature identification manager 302. The feature identification manager 302 may identify feature labels based on the test data 114. For example, the feature identification manger 302 may identify features based on label information that includes previously identified features associated with respective test instances.

In addition to or as an alternative to identifying feature labels associated with test instances within the test data 114, the feature identification manager 302 may further augment the test data 114 to include one or more feature labels not previously included within test data 114. For example, the feature identification manager 302 may augment the test data 114 to include one or more additional feature labels by evaluating the test instances and associated data to identify any number of features associated with corresponding test instances. In one or more implementations, the feature identification manager 302 may augment the feature labels by applying an augmented feature model including one or more machine learning models trained to identify any number of features (e.g., from a predetermined number of known features to the machine learning model) associated with the test instances. Upon identifying or otherwise augmenting the feature data associated with the test instances, the feature identification manager 302 may provide augmented features (e.g., identified and/or created feature labels) to the cluster manager 306 for further processing.

As further shown in FIG. 3, an error identification manager 304 may receive test outputs from the machine learning system 108 including outputs generated by the machine learning system 108 based on respective test instances from the test dataset. In addition to the test outputs, the error identification manager 304 may further receive test data 114 from the training system 110 that includes label information indicating ground truths. The ground truths may include expected outputs of the machine learning system 108 corresponding to the test instances.

The error identification manager 304 may compare the test outputs to the ground truth data to identify outputs from the test outputs that are inaccurate with respect to corresponding ground truth data. In one or more embodiments, the error identification manager 304 generates error labels and associates the error labels with corresponding test instances in which the test output does not match or is otherwise inaccurate with respect to the ground truth data. As shown in FIG. 3, the error identification manager 304 may provide the identified errors (e.g., error labels) to the cluster manager 306 for further processing.

The cluster manager 306 may generate feature clusters based on a combination of the augmented features provided by the feature identification manager 302 and the identified errors provided by the error identification manager 304. In particular, the cluster manager 306 may determine correlations between features (e.g., individual features, combinations of multiple features) and the error labels. For example, the cluster manager 306 may identify correlation metrics associated with any number of features and the error labels. The correlation metrics may indicate a strength of correlation between test instances having certain combinations of features (e.g., associated combinations of feature labels) and a number or percentage of output errors for outputs based on those test instances associated with the combinations of features.

The cluster manager 306 may identify or generate feature clusters in a variety of ways. As an example, the cluster manager 306 may identify any combination of one or two features (or other maximum number of combined features) and determine a correlation metric between test instances associated with each combination of one or two features. The cluster manager 306 may rank the respective feature combinations to identify feature combinations that have a higher correlation to output failures than other combinations of features. The cluster manager 306 may generate feature clusters for a predetermined number of feature combinations based on the feature combinations having a higher correlation to output failures than other combinations of features.

In one or more embodiments, the cluster manager 306 implements an algorithm or machine learning model (e.g., a clustering model) trained to generate feature clusters based on a number of provided parameters or constraints. For example, the cluster manager 306 may apply a machine learning model to the test instances to group the test instances or otherwise generate feature clusters associated with corresponding combinations of features in accordance with the parameters and constraints. This may include generating clusters having approximate sizes (e.g., number of instances), ensuring that feature clusters have a minimum size (e.g., a minimum cluster constraint requiring 50 or more test instances), or other constraints or parameters.

In addition to clustering techniques discussed above, the cluster manager 306 may implement agglomerative hierarchical clustering techniques and Euclidean distance (e.g., feature vectors) as a similarity measure between different features. By using agglomerative hierarchical clustering, the cluster manager 306 may merge groupings of instances having non-identical, albeit similar feature labels (e.g., feature labels having a small Euclidean distance between respective labels) where performance of the machine learning system 108 may have similar results for the similar feature labels. As an example, where two different feature labels refer to "snowboarding" and "skiing," the cluster manager 306 may determine that merging these labels into a single feature category is useful in identifying similar feature labels that have similar or identical correlation metrics to output failures.

As shown in FIG. 3, the cluster manager 306 can generate feature clusters 310a-n associated with combinations of one or more features. For example, the cluster manager 306 can generate a first feature cluster 310a based on an identified combination of features having a higher correlation to failed outputs than other combinations of features. The cluster manager 306 may further generate a second feature cluster 310b based on an identified combination of features having a second highest correlation to failed outputs than other combinations of features. As shown in FIG. 3, the cluster manager 306 may generate any number of feature clusters 310a-n based on combinations of feature labels. In one or more embodiments, the listing of feature clusters 310a-n is representative of a ranking of feature combinations having a high correlation between corresponding test instances and output failures relative to other combinations of features.

As mentioned above, the feature clusters may satisfy one or more constraints or parameters in accordance with criteria used by the cluster manager 306 when generating the feature clusters. For example, the cluster manager 306 may generate a predetermined number of feature clusters to avoid generating an unhelpful number of clusters (e.g., too many distinct clusters) or clusters that are too small to provide meaningful information. The cluster manager 306 may further generate feature clusters having a minimum number of test instances to ensure that each cluster provides a meaningful number of test instances.

In one or more embodiments, the feature clusters 310a-n include some overlap between respective groupings of test instances. For example, one or more test instances associated with the first feature cluster 310a may similarly be grouped within the second feature cluster 310b. Alternatively, in one or more embodiments, the feature clusters 310a-n include discrete and non-overlapping groupings of test instances in which test instance do not overlap between feature clusters. Accordingly, in some embodiments, the first feature cluster 310a includes no common test instances as the second feature cluster 310b.

As shown in FIG. 3, the cluster manager 306 can provide the feature clusters to the cluster output generator 308 for generating performance views for the respective clusters 310a-n. For example, the cluster output generator 308 may generate a global performance view indicating a performance of the machine learning system 108 over all of the identified clusters 310a-n. In addition, the cluster output generator 308 may generate cluster performance views corresponding to performance of the machine learning system 108 with respect to each of the individual clusters 310a-n. Therefore, the cluster output generator 308 may generate a first cluster performance view based on performance of the machine learning system 108 with respect to test instances from the first feature cluster 310a and a second performance view based on performance of the machine learning system 108 with respect to test instances from the second feature cluster 310b, and so forth for each of the feature clusters 310a-n.

In addition to the global view and the cluster views, the cluster output generator 308 may further provide instance views including information associated with performance of the machine learning system 108 associated with individual test instances. For example, an instance view may include an output generated by the machine learning system 108 for a test instance as well as ground truth data for the test instance. In one or more embodiments, the instance view further includes one or more outputs of multiple stages or machine learning models within the machine learning system. Moreover, the instance view may include system performance values such as confidence values associated with the output and/or ground truth with respect to the test instance. Additional information with respect to the different performance views is discussed below in connection with FIGS. 5A-C.

As shown in FIG. 3, the cluster output generator 308 may provide the performance views and associated performance data to the client device 116 for further processing. As further shown, the client device 116 may provide failure information to the training system 110 to guide the training system 110 in further refining the machine learning system 108. For example, the client device 116 may provide an indication of one or more feature clusters associated with low performance of the machine learning system 108. In one or more embodiments, the client device 116 provides the failure information based on interactions with the performance views by a user of the client device 116.

Upon receiving the failure information, the training system 110 may further provide additional training data 112 to the machine learning system 108 to fine-tune or otherwise refine one or more machine learning models of the machine learning system 108. In particular, the training system 110 may selectively sample or identify training data 112 (e.g., a subset of training data from a larger collection of training data) corresponding to one or more identified feature clusters associated with high error rates or otherwise low performance of the machine learning system 108 and provide relevant and helpful training data 112 to the machine learning system 108 to enable the machine learning system 108 to generate more accurate outputs for input instances having similar sets of features. Moreover, the training system 110 can selectively sample training data associated with poor performance of the machine learning system 108 without providing unnecessary or unhelpful training data 112 for which the machine learning system 108 is already adequately trained to process.

Upon refining the machine learning system 108, the model evaluation system 106 may similarly collect test data and additional outputs from the refined machine learning system 108 to further evaluate performance of the machine learning system 108 and generate performance views including updated performance statistics. Indeed, the model evaluation system 106 and training system 110 may iteratively generate performance views, collect additional failure information, and further refine the machine learning system 108 any number of times until the machine learning system 108 is performing at a satisfactory or threshold level of accuracy generally and/or across each of the feature clusters.

Figure 4A:
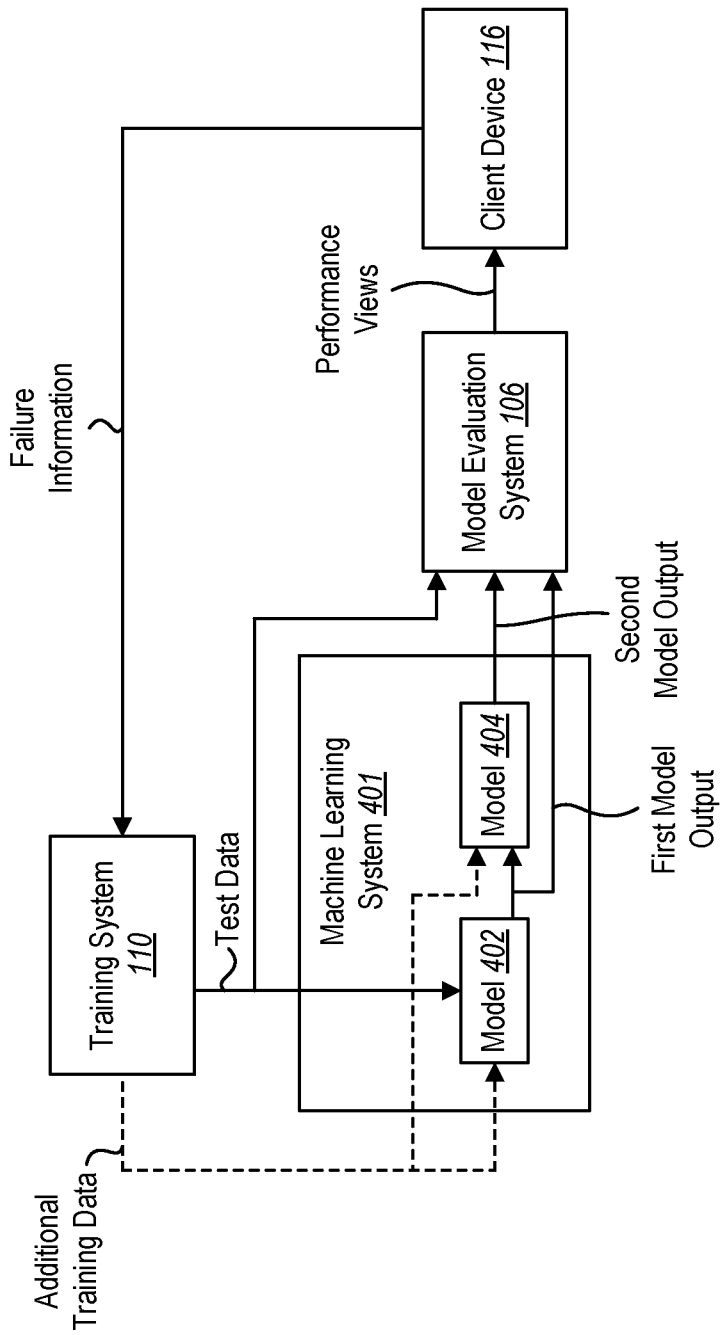
FIGS. 4A-4B illustrate example implementations of the model evaluation system evaluating a machine learning system including multiple machine learning components in accordance with one or more embodiments.
Figure 4B:
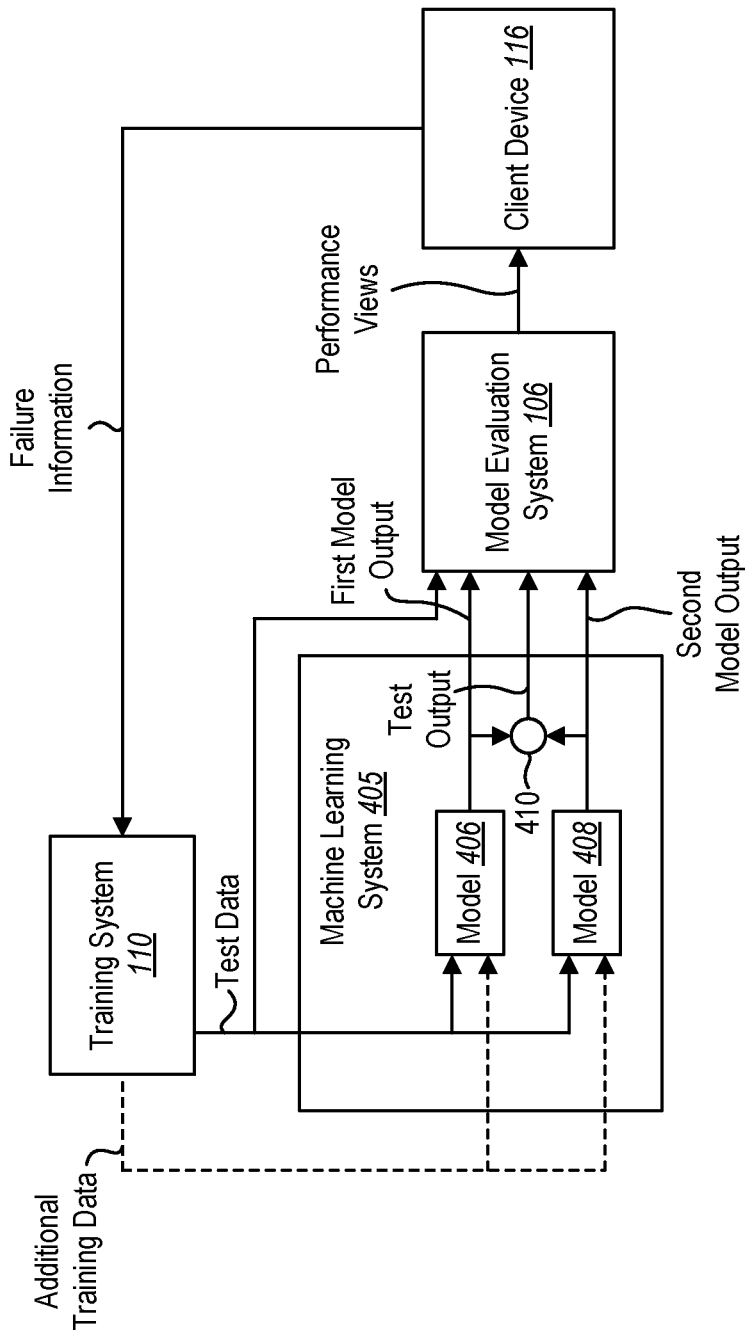

While FIG. 3 illustrates an example framework in which performance of a machine learning system 108 is evaluated with respect to identified feature clusters, FIGS. 4A-4B illustrate additional features of the framework in which performance of subcomponents of a machine learning system are evaluated in accordance with one or more embodiments. For example, FIG. 4A illustrates an example machine learning system 401 including a sequence of models 402-404 (e.g., machine learning models) individually trained to perform respective functions and generate outputs that cooperatively generate an output for the machine learning system 108.

In particular, as shown in FIG. 4A, the machine learning system 401 receives test data from the training system 110 including a set of test instances as input to the first model 402. The first model 402 may be trained to generate a first model output for each of the test instances to provide as an input to the second model 404. The second model 404 may be trained to generate a second model output based on the first model output (e.g., a datatype of the first model output) provided as an input to the second model 404. As shown in FIG. 4A, in addition to a test output corresponding to an output of the second model 404, the model evaluation system 106 may additionally receive the first model output.

Because either the first model 402 or the second model 404 are possible contributors to output errors, the model evaluation system 106 may evaluate performance of not only the machine learning system 401, but each model 402-404 of the machine learning system 401. For example, as shown in FIG. 4A, the model evaluation system 106 may receive test data including feature labels and ground truth data, which the model evaluation system 106 may use to evaluate performance of each of the individual models 402-404.

In accordance with one or more embodiments described herein, the model evaluation system 106 may identify feature clusters based on feature labels and corresponding error labels (e.g., rates of output errors associated with test outputs from the machine learning system 401). In addition, the model evaluation system 106 may further performance metrics of the multiple models 402-404 with respect to the identified feature clusters. In one or more implementations, the model evaluation system 106 further includes the performance metrics of the individual models 402-404 with the performance views provided to the client device 116.

Similar to one or more embodiments described above, the client device 116 may receive the performance views (in addition to performance metrics for the different models 402-404) and provide failure information to the training system 110. In addition to identified feature clusters, the failure information may include performance metrics associated with the respective models 402-404. For example, the failure information may include failure rates identified by the model evaluation system 106 and/or client device 116 with respect to the individual models 402-404 to enable the training system 110 to determine whether additional training is needed for the machine learning system 401 as a whole or, alternatively, for one of the models 402-404.

In this way, the training system 110 may selectively identify additional training data to provide to one or both of the models 402-404 to further train or refine the models 402-404. Accordingly, where one model of the machine learning system 401 is performing as predicted while the other model is experiencing a higher rate of output failures, the training system 110 may selectively identify training data and/or selectively train a single model rather than performance more computationally expensive and/or unnecessary training of the entire machine learning system 401.

Similar to FIG. 4A, FIG. 4B illustrates an example framework including a machine learning system 405 having multiple models 406-410 (e.g., machine learning models) trained to cooperatively generate an output based on an input instance. In contrast to the machine learning system 401 of FIG. 4A that includes multiple models 402-404 in sequence, the machine learning system 405 may include parallel models 406-408 that each receive a test instance and generate respective outputs. For example, a first model 406 may generate a first model output based on a test instance while a second model 408 generates a second model output based on the same test instance received from the training system 110. As further shown, the machine learning system 405 may include a combiner model (e.g., a multi-modal model) 410 that combines the first model output and the second model output to generate a test output to provide to the model evaluation system 106.

Because either the first model output or the second model output may contribute to potential output errors, the model evaluation system 106 may obtain or otherwise receive each of the model outputs in addition to the test output based on the combination of both the first model output and the second model output. The model evaluation system 106 may use each of the outputs and the received test data to evaluate performance of the individual models 406-410.

Similar to FIG. 4A, the model evaluation system 106 may provide performance views as well as performance metrics for the individual models 406-410 to the client device 116. The client device 116 may further provide failure information to the training system 110. In accordance with examples discussed above, the training system 110 may selectively identify additional training data to use in refining the machine learning system 405, which may include selectively refining individual models 406-410 based on one or more identified feature clusters.

While FIGS. 4A-4B illustrate machine learning systems including two or three different models, this is provided by way of example only. It will be understood that a machine learning system may include any number of models or components that make up the overall machine learning system. Moreover, the model evaluation system 106 may apply similar methodologies discussed herein for identifying clusters and generating performance views for not only the machine learning system as a whole, but for each individual model. Thus, a user of a client device 116 may specifically view and interact with performance views (including cluster views or instance views) for a single model within the machine learning system rather than performance views representative of performance of the entire machine learning system in accordance with various examples discussed herein.

Figure 5A:
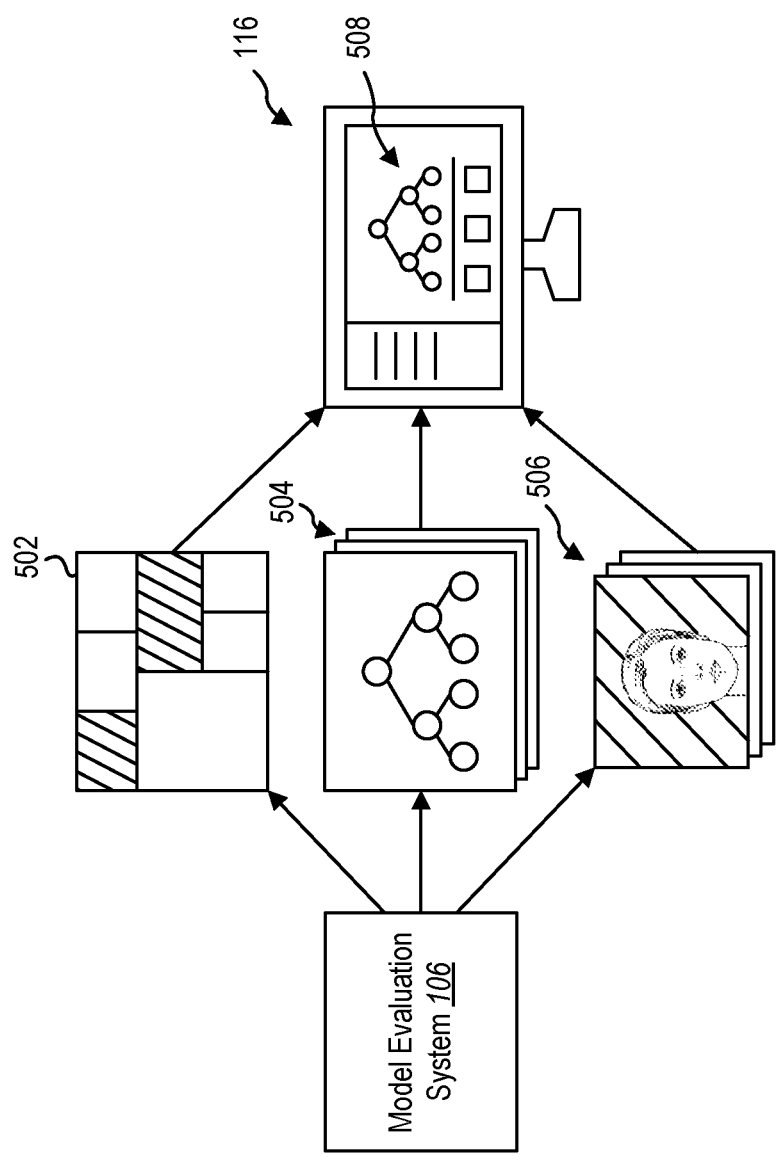
FIG. 5A illustrates an example workflow for generating one or more performance views in accordance with one or more embodiments.

Moving onto FIG. 5A, this figure illustrates an example set of performance views that the model evaluation system 106 may provide to the client device 116. For example, the model evaluation system 106 may provide a global view 502 including a representation of output errors across multiple identified feature clusters. As shown in FIG. 5A, the global view 502 may include a grid or other visual grouping of clusters in which each block of the global view 502 is associated with an identified feature cluster. The global view 502 may include visual indicators (as denoted by shaded clusters) to indicate one or more failure rates of a machine learning system with respect to test instances corresponding to associated feature clusters. The global view 502 may include other indicators indicating size of the cluster (e.g., based on a size of a block representing a feature cluster) or other useful metrics associated with the feature clusters.

Each of the feature clusters from the global view 502 may correspond to one of a plurality of cluster views 504. The cluster views 504 may include a representation of a specific cluster, which may include a tree of nodes representative of one or multiple features. In one or more embodiments, the cluster views include interpretable statistical learning models that describe errors with respect to combinations of feature conditions.

As an illustrative example of a cluster view, where a feature refers to faces of individuals wearing glasses, a cluster view may include a root node associated with an entire training dataset of face images with another row of the tree branching into multiple nodes representing images with glasses (e.g., images associated with a feature label indicating that an individual is wearing glasses) and images without glasses. The cluster view may include any number of rows associated with corresponding features or combinations of features. Moreover, each of the nodes may include two or more branches representative of two or more subsets of test instances having the feature of the root node.

The model evaluation system 106 may further provide a plurality of instance views 506 corresponding to each test instance from a test dataset. The instance views 506 may include a representation of the test instance itself (e.g., a digital image, digital video) as well as associated test data. For example, an instance view may include an indication of a test output from a machine learning system, incremental outputs from models within the machine learning system, identified features of the test instance, and any other information associated with the test instance.

In each of the above performance views 502-506, the model evaluation system 106 may include additional information about performance of a machine learning system in connection with specific instances, cluster nodes, feature clusters, or an entire dataset. For example, the performance views may include a content view including various crowd data metrics and/or system data metrics associated with when the machine learning system is accurate or fails with respect to one or more test instances. Moreover, the performance views may include a system view including various crowd data metrics and/or system data metrics associated with how the machine learning system is accurate or fails with respect to one or more test instances. As used herein, crowd data metrics refers to statistics associated with ground truth data. As used herein, system data metrics refer to statistics associated with outputs generated by the machine learning system.

It will be understood that the content-based view provides a visualization of performance of the machine learning system from an outer user perspective (e.g., what an ideal system should know) rather than an inner system perspective (e.g., what the machine learning system knows). This outer user perspective may help users understand when to expect failures and cannot be created without inputs from human computations. Moreover, the system-based view provides a characterization of performance from an inner system rather than an outer user perspective. This inner system perspective helps teach the system about its failures or inaccuracies.

As an illustrative example and not by way of limitation to a specific type of machine learning model or a specific input domain, where a machine learning system is trained to caption an image or video (e.g., by providing a description of one or more objects therein), the machine learning system may include a first model for generating a list of objects and a second model to generating a description of the image based on the list of objects. In this example, the content view may include crowd data metrics including a ground truth objects list, a ground truth activities list, a ground truth count of objects, and a ground truth count of activities. The content view may further include system data metrics including a detected object list, a detected activities list, a detected count of objects, and a detected count of activities.

Further relating to this example, a system view may include crowd data metrics such as a precision recall value corresponding to the list of objects, a precision recall value corresponding to the list of activities, a language commonsense value as determined by a language model, and a satisfaction of captions as ranked by individuals when collecting the training data. The component view may further include system data including statistical values such as average, maximum, minimum, and standard deviation confidence values for a visual detector, language model, caption ranker or other component employed by the machine learning system as well as confidence values associated with respective outputs of the individual models.

As shown in FIG. 5A, the model evaluation system 106 may provide the performance views 502-506 to the client device 116 for presentation of one or more performance views via a graphical user interface 508 on the client device 116. In one or more embodiments, a user of the client device 116 may interact with the performance views to navigate through different clusters, nodes, and/or test instances to explore when and how the machine learning system is failing to better understand and evaluate performance of the machine learning system. In accordance with one or more embodiments described herein, the client device 116 may be used to provide failure information to the model evaluation system 106 and/or the testing system 110 for further processing and determining how the further train or refine a machine learning system.

Figures 5B, 5C:
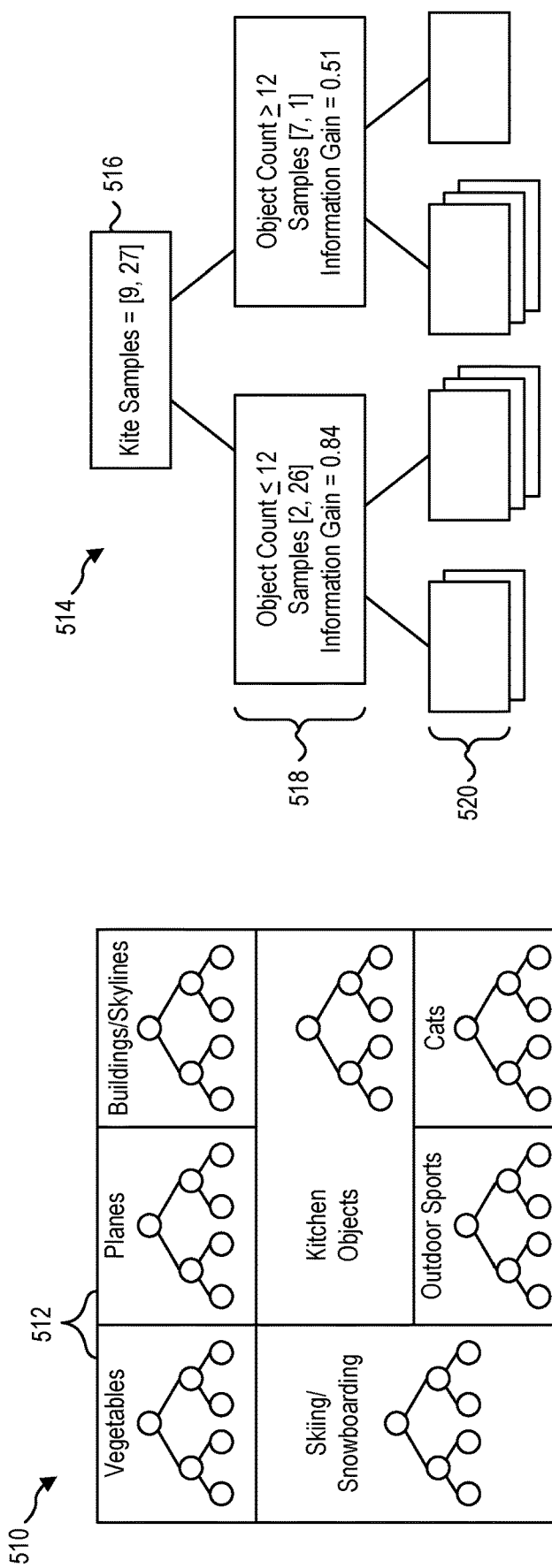
FIGS. 5B-5C illustrate example performance views in accordance with one or more embodiments.

FIG. 5B illustrates an example global view 510 including indicated feature clusters 512 identified by the model evaluation system 106. As shown in FIG. 5B, the model evaluation system 106 may identify feature clusters based on single features or combinations of features such as "vegetables," "planes," "buildings and skylines," "skiing and snowboarding," "kitchen objects," "cats," and "outdoor sports." The model evaluation system 106 may identify these feature clusters in accordance with one or more embodiments described above. While not shown in FIG. 5B, the global view 510 may include performance statistics (e.g., model performance metrics) associated with performance of the machine learning system in connection with respective feature clusters 512 shown within the global view 510.

FIG. 5C illustrates an example cluster view 514 including multiple layers 516-520 having a number of nodes. For example, where a feature cluster refers to a "kite" feature (e.g., whether an image includes a detected kite therein), the model evaluation system 106 may indicate that 16 test instances include 9 incorrect outputs compared to 27 correct outputs (corresponding to a reasonably high count of errors for the feature cluster). Based on this error rate, the model evaluation system 106 or client device 116 may provide failure information to indicate that additional training based on images having kites therein may be useful for further training or refining a machine learning system.

Drilling down to a second level 518 of the cluster view 514, the model evaluation system 106 may provide an indication that a total count of objects also has a strong correlation to error labels from the test data. For example, as shown in FIG. 5C, a first node (the left node) may include an indication of a high success rate (e.g., 2 failed outputs compared to 26 correct outputs). This success rate may indicate that while a failure rate for instances having kites therein may be high, the failure rate is nevertheless low when a total count of objects within the instances is less than or equal to 12 objects. Alternatively, as shown in FIG. 5C, a second node (the right node) may include an indication of a low success rate (e.g., 7 failed outputs compared to 1 correct input), indicating that the failure rate is much higher for instances in which a count of objects exceeds 12. The client device 116 may use this information to provide additional failure information to the training system 110 to facilitate selective identification of training data to more efficiently refine or train the machine learning system.

As further shown in the cluster view 514, one or more of the nodes may include performance metrics such as information gain. For example, the left node of the second level 518 may indicate an information gain of 0.84 while the right node of the second level 518 may indicate an information gain of 0.51. As used herein, "information gain" may refer to an amount of information gained about a first variable (e.g., an error label) by observing another second variable (e.g., an object count) associated with a corresponding set (e.g., cluster) of instances. For a binary label (e.g., true/false classification), an information gain metric may range from 0 to 1 where 1 indicates that by knowing the second variable (e.g., the object count), the model evaluation system 106 may accurately predict the first variable (e.g., the error label). Thus, in the illustrated example where the right node of the second level 518 includes an information gain metric of 0.54, the object count may reveal 0.54 bits (out of 1) on expectation.

As further shown, the cluster view 514 may include a third level 520 including instances associated with the respective outputs from the feature cluster. In one or more embodiments, a user may select the displayed instances to receive an instance view that enables a user of the client device 116 to further view information associated with performance of the machine learning system with respect to individual instances.

Figure 6:
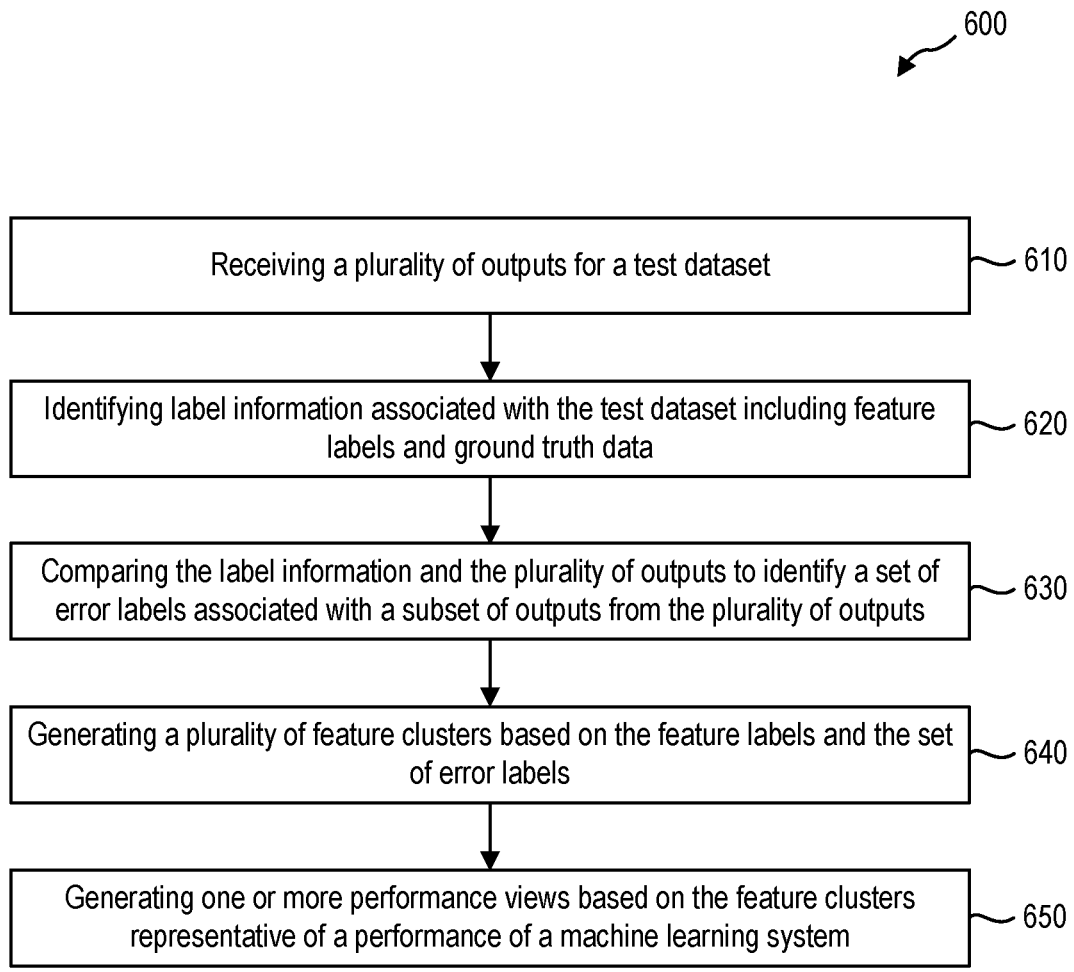
FIG. 6 illustrates an example method for evaluating a machine learning system in accordance with one or more embodiments.

Turning now to FIG. 6, this figure illustrates an example flowchart including a series of acts for evaluating performance of a machine learning system with respect to one or more feature clusters. While FIG. 6 illustrates acts according to one or more embodiments, alternative embodiments may omit, add to, reorder, and/or modify any of the acts shown in FIG. 6. The acts of FIG. 6 can be performed as part of a method. Alternatively, a non-transitory computer-readable medium can include instructions that, when executed by one or more processors, cause a computing device to perform the acts of FIG. 6. In still further embodiments, a system can perform the acts of FIG. 6.

FIG. 6 illustrates a series of acts 600 including an act 610 of receiving a plurality of outputs for a test dataset. For example, the act 610 may include receiving (e.g., from a machine learning system trained to generate an output for a given instance) a plurality of outputs for a test dataset, the test dataset comprising a plurality of test instances. In one or more embodiments, the output for the given instance includes a classification of a digital media content item, the classification including one or more of a predicted user rating for the digital media content item, an identification of objects within the digital media content item, a count of objects within the digital media content item, a description of content within the digital media content item, or an indication of quality of the digital media content item.

The series of acts 600 may further include an act 620 of identifying label information associated with the test dataset including feature labels and ground truth data. For example, the act 620 may include identifying label information associated with the test dataset, the label information comprising feature labels associated with respective instances from the plurality of test instances and ground truth data corresponding to expected outputs of the machine learning system with respect to the plurality of test instances.

In one or more embodiments, identifying label information includes receiving the ground truth data based on information provided by individuals when presented with the plurality of test instances. In one or more embodiments, identifying label information may include applying an augmented feature model trained to identify features from a set of instances to the plurality of test instances to generate the feature labels based on features identified in connection with respective test instances of the plurality of test instances.

The series of acts 600 may also include an act 630 of comparing the label information and the plurality of outputs to identify a set of error labels associated with a subset of outputs from the plurality of outputs. For example, the acts 630 may include comparing the label information and the plurality of outputs to identify a set of error labels associated with a subset of outputs from the plurality of outputs that are inaccurate with respect to corresponding label information.

The series of acts 600 may further include an act 640 of generating a plurality of feature clusters based on the feature labels and the set of error labels. For example, the act 640 may include generating a plurality of feature clusters comprising groupings of test instances from the plurality of test instances based on the feature labels and the set of error labels. In one or more embodiments, generating the plurality of feature clusters includes applying a clustering model trained to identify groupings of test instances from a collection of test instances based on groupings of features associated with output failures generated by a given machine learning model.

In one or more embodiments, generating the plurality of feature clusters includes identifying combinations of one or more feature labels having a higher correlation to the set of error labels than other combinations of one or more feature labels and grouping the test instances in accordance with the identified combinations of one or more feature labels having the higher correlation to the set of error labels. In one or more implementations, identifying the combinations of one or more feature labels having the higher correlation to the set of error labels is based on a minimum cluster constraint in which each grouping of test instances has a number of test instances greater than or equal to a minimum threshold number of test instances.

In one or more embodiments, the series of acts 600 includes an act 650 of generating one or more performance views based on the feature clusters representative of a performance of the machine learning system. For example, the act 650 may include generating plurality of performance views associated with performance of the machine learning system with respect to the plurality of feature clusters. Generating the performance views may include generating a global performance view including an indication of performance of the machine learning system with respect to each feature cluster from the plurality of feature clusters. Generating the performance views may further include generating a plurality of cluster views including, for each feature cluster of the plurality of feature clusters, a multi-branch view representative of performance of the machine learning system with respect to two or more subsets of test instances from the feature cluster.

The machine learning system may include a first machine learning model trained to generate a first output for the given instance and a second machine learning model trained to generate a second output for the given instance. An output from the machine learning system for a given instance may be based on a combination of the first output and the second output. In one or more embodiments, comparing the label information and the plurality of outputs may include comparing the label information to a first plurality of outputs corresponding to the first machine learning model and a second plurality of outputs corresponding to the second machine learning model. Further, the series of acts 600 may include generating a plurality of quality metrics for the plurality of outputs indicative of performances of the first machine learning model and the second machine learning model.

In one or more embodiments, the series of acts 600 includes identifying, from the plurality of feature clusters, a feature cluster of interest based on a rate of error labels associated with a corresponding grouping of test instances for the feature cluster of interest. The series of acts 600 may further include refining the machine learning system by selectively collecting additional training data including a plurality of training instances based on associated label information where the associated label information includes one or more feature labels associated with the identified feature cluster of interest. In one or more embodiments, selectively collecting additional training data includes sampling a subset of training instances from a collection of training instances based on the label information associated with the subset of training instances including the one or more feature labels associated with the identified feature cluster of interest.

Figure 7:
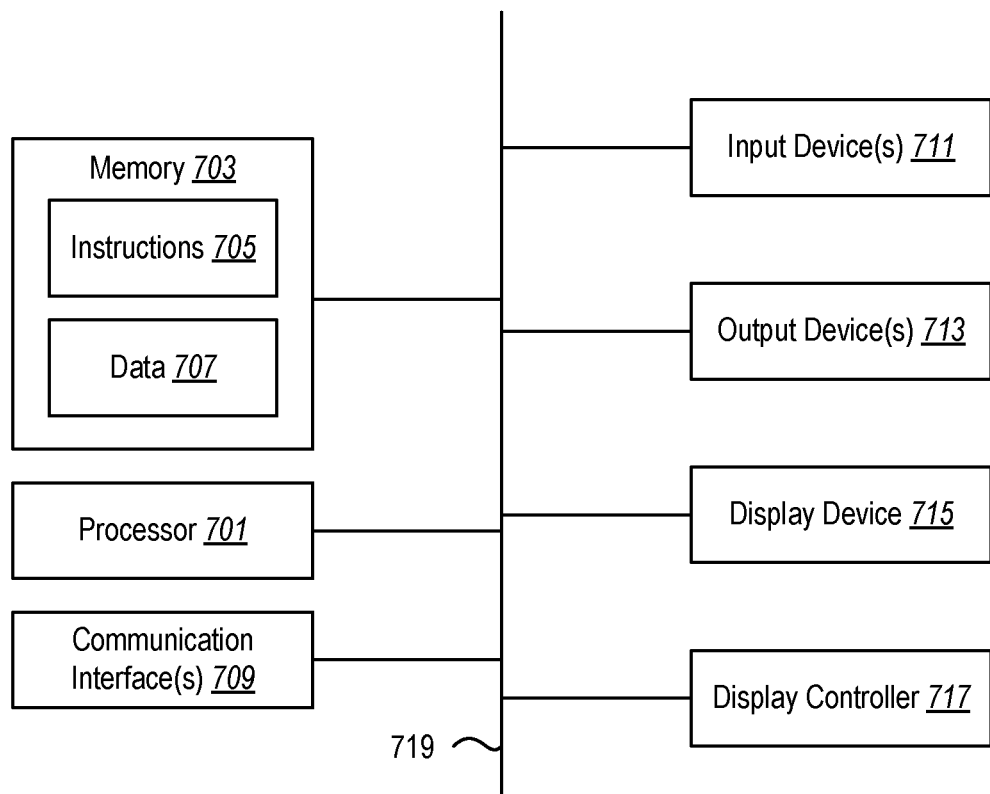
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    receiving a plurality of outputs for a test dataset, the test dataset comprising a plurality of test instances;
    identifying label information associated with the test dataset, the label information comprising feature labels associated with respective instances from the plurality of test instances and ground truth data corresponding to expected outputs of a machine learning system with respect to the plurality of test instances;
    comparing the label information and the plurality of outputs to identify a set of error labels associated with a subset of outputs from the plurality of outputs that are inaccurate with respect to corresponding label information by identifying combinations of one or more feature labels having a higher correlation to the set of error labels than other combinations of one or more feature labels and grouping the test instances in accordance with the identified combinations of one or more feature labels having the higher correlation to the set of error labels; and
    generating a plurality of feature clusters comprising groupings of test instances from the plurality of test instances based on the feature labels and the set of error labels.

2. The method of claim 1, further comprising generating a plurality of performance views associated with performance of the machine learning system with respect to the plurality of feature clusters.

3. The method of claim 2, wherein generating the plurality of performance views comprises:
    generating a global performance view including an indication of performance of the machine learning system with respect to each feature cluster from the plurality of feature clusters; and
    generating a plurality of cluster views including, for each feature cluster of the plurality of feature clusters, a multi-branch view representative of performance of the machine learning system with respect to two or more subsets of test instances from the feature cluster.

4. The method of claim 1, wherein the machine learning system comprises a first machine learning model trained to generate a first output for the given instance and a second machine learning model trained to generate a second output for the given instance, wherein the output for the given instance is based on a combination of the first output and the second output.

5. The method of claim 4, wherein comparing the label information and the plurality of outputs further comprises comparing the label information to a first plurality of outputs corresponding to the first machine learning model and a second plurality of outputs corresponding to the second machine learning model, and wherein the method further comprises generating a plurality of quality metrics for the plurality of outputs indicative of performances of the first machine learning model and the second machine learning model.

6. The method of claim 1, wherein identifying label information comprises applying an augmented feature model trained to identify features from a set of instances to the plurality of test instances to generate the feature labels based on features identified in connection with respective test instances of the plurality of test instances.

7. The method of claim 1, wherein the output for the given instance comprises a classification of a digital media content item, the classification comprising one or more of a predicted user rating for the digital media content item, an identification of objects within the digital media content item, a count of objects within the digital media content item, a description of content within the digital media content item, or an indication of quality of the digital media content item.

8. The method of claim 1, wherein identifying the combinations of one or more feature labels having the higher correlation to the set of error labels is based on a minimum cluster constraint in which each grouping of test instances has a number of test instances greater than or equal to a minimum threshold number of test instances.

9. The method of claim 1, wherein generating the plurality of feature clusters comprises applying a clustering model trained to identify groupings of test instances from a collection of test instances based on groupings of features associated with output failures generated by a given machine learning model.

10. The method of claim 1, further comprising:
    identifying, from the plurality of feature clusters, a feature cluster of interest based on a rate of error labels associated with a corresponding grouping of test instances for the feature cluster of interest; and
    refining the machine learning system by selectively collecting additional training data including a plurality of training instances based on associated label information, wherein the associated label information includes one or more feature labels associated with the identified feature cluster of interest.

11. The method of claim 10, wherein selectively collecting additional training data comprises sampling a subset of training instances from a collection of training instances based on the label information associated with the subset of training instances including the one or more feature labels associated with the identified feature cluster of interest.

12. A system, comprising:
    one or more processors;
    memory in electronic communication with the one or more processors; and
    instructions stored in the memory, the instructions being executable by the one or more processors to:
        receive a plurality of outputs for a test dataset, the test dataset comprising a plurality of test instances;
        identify label information associated with the test dataset, the label information comprising feature labels associated with respective instances from the plurality of test instances and ground truth data corresponding to expected outputs of a machine learning system with respect to the plurality of test instances;
        compare the label information and the plurality of outputs to identify a set of error labels associated with a subset of outputs from the plurality of outputs that are inaccurate with respect to corresponding label information by identifying combinations of one or more feature labels having a higher correlation to the set of error labels than other combinations of one or more feature labels and grouping the test instances in accordance with the identified combinations of one or more feature labels having the higher correlation to the set of error labels; and generate a plurality of feature clusters comprising groupings of test instances from the plurality of test instances based on the feature labels and the set of error labels.

13. The system of claim 12, further comprising instructions being executable by the one or more processors to generate a plurality of performance views associated with performance of the machine learning system with respect to the plurality of feature clusters.

14. The system of claim 12, wherein identifying label information comprises:

receiving label information previously associated with the test dataset; and augmenting the label information by applying an augmented feature model trained to identify features associated with a given set of instances to the plurality of test instances to identify one or more additional features associated with the plurality of test instances not previously included within the received label information.

15. The system of claim 12, further comprising instructions being executable by the one or more processors to:

identify, from the plurality of feature clusters, a feature cluster of interest based on a rate of error labels associated with a corresponding grouping of test instances for the feature cluster of interest; and refine the machine learning system by selectively collecting additional training data including a plurality of training instances based on associated label information, wherein the associated label information includes one or more feature labels associated with the identified feature cluster of interest.

16. A method, comprising:

receiving a plurality of outputs for a test dataset, the test dataset comprising a plurality of test instances;

identifying label information associated with the test dataset, the label information comprising feature labels associated with respective instances from the plurality of test instances and ground truth data corresponding to expected outputs of a machine learning system with respect to the plurality of test instances, wherein identifying label information includes receiving the ground truth data based on information provided by individuals when presented with the plurality of test instances;

comparing the label information and the plurality of outputs to identify a set of error labels associated with a subset of outputs from the plurality of outputs that are inaccurate with respect to corresponding label information; and generating a plurality of feature clusters comprising groupings of test instances from the plurality of test instances based on the feature labels and the set of error labels.

17. The method of claim 16, further comprising generating a plurality of performance views associated with performance of the machine learning system with respect to the plurality of feature clusters.

18. The method of claim 16, wherein the machine learning system comprises a first machine learning model trained to generate a first output for the given instance and a second machine learning model trained to generate a second output for the given instance, wherein the output for the given instance is based on a combination of the first output and the second output.

19. The method of claim 16, wherein the output for the given instance comprises a classification of a digital media content item, the classification comprising one or more of a predicted user rating for the digital media content item, an identification of objects within the digital media content item, a count of objects within the digital media content item, a description of content within the digital media content item, or an indication of quality of the digital media content item.

20. The method of claim 16, wherein generating the plurality of feature clusters comprises applying a clustering model trained to identify groupings of test instances from a collection of test instances based on groupings of features associated with output failures generated by a given machine learning model.

* * * * *